US012806587B2

(12) United States Patent
Ye et al.

(10) Patent No.: US 12,806,587 B2
(45) Date of Patent: Nov. 24, 2026

(54) PORTABLE DRINK BLENDER

(71) Applicant: Party IP Holdings, LLC, Orlando, FL (US)

(72) Inventors: Junyu Ye, Leuven (BE); Wim De Vos, Kruisem (BE); Ine M.K. Vandaele, Baardegem (BE); Sander Schelfout, Aalst (BE); Dimitri M.C.J. Backaert, Moorsel (BE); Bavo De Zutter, De Pinte (BE)

(73) Assignee: Party IP Holdings LLC, Orlando, FL (US)

( * ) Notice: Subject to any disclaimer, the term of this patent is extended or adjusted under 35 U.S.C. 154(b) by 869 days.

(21) Appl. No.: 17/744,544

(22) Filed: May 13, 2022

(65) Prior Publication Data

US 2023/0364567 A1 Nov. 16, 2023

(51) Int. Cl.
*B01F 33/00* (2022.01)
*A47J 43/046* (2006.01)
(Continued)

(52) U.S. Cl.
CPC ......... *B01F 33/5011* (2022.01); *A47J 43/046* (2013.01); *A47J 43/0772* (2013.01); *B01F 27/808* (2022.01); *B01F 2101/14* (2022.01)

(58) Field of Classification Search
CPC ............... B01F 33/5011; B01F 2101/14; A47J 43/0772; A47J 43/044; A47J 2043/04409; A47J 2043/04427; A47J 2043/04436
See application file for complete search history.

(56) References Cited

U.S. PATENT DOCUMENTS 4,497,580 A * 2/1985 Doyel ................. B01F 35/7544 366/279
5,199,788 A * 4/1993 Stallings ................. B01F 27/88 366/605
(Continued)

FOREIGN PATENT DOCUMENTS

CN 306491603 4/2021
CN 112826292 A 5/2021
(Continued)

OTHER PUBLICATIONS

Amazon.com, Inc., "ACUNA Protein Shaker—700ml (Pack of 2) | Protein Shaker Bottle With Mixer Ball for Smooth Shake, Leak-proof Secure Flip Cap, Gym Shaker for Protein Shakes Ideal Workout Partner (Black-Grey)", [online]. (Date First Available: Aug. 25, 2021). [Retrieved from the Internet on Oct. 9, 2024 at https://www.amazon.co.uk/ACU NA-Supplements-Smoothie-Leakproof-Black-Grey/dp/B09DLGQHLB]; 13 pages.
(Continued)

*Primary Examiner* — Anshu Bhatia
(74) *Attorney, Agent, or Firm* — COOLEY LLP

(57) ABSTRACT

A portable drink blender includes a blade rotation axis offset from center such that the blender blades to not extend across in interior of the drinking spout. The motor housing is formed of a lower housing having the complete spout formed therein, and an upper housing including an aperture through which the spout extends. A cover interlock is provided which prevents operation of the motor unless the cover is in the closed position to seal the spout closed.

3 Claims, 5 Drawing Sheets

(51) Int. Cl.

| | |
|---|---|
| ***A47J 43/07*** | (2006.01) |
| ***B01F 27/808*** | (2022.01) |
| ***B01F 33/501*** | (2022.01) |
| *B01F 101/14* | (2022.01) |

(56) References Cited

U.S. PATENT DOCUMENTS

| | | | | |
|---|---|---|---|---|
| D632,918 | S | 2/2011 | Gordon | |
| D667,269 | S | 9/2012 | Pallotto | |
| D695,069 | S | 12/2013 | Lane | |
| D699,996 | S | 2/2014 | De Leo | |
| D725,966 | S | 4/2015 | Boroski et al. | |
| D730,694 | S | 6/2015 | Elsaden et al. | |
| D754,483 | S | 4/2016 | Elsaden et al. | |
| D767,334 | S | 9/2016 | Pan | |
| D783,355 | S | 4/2017 | Tu | |
| D785,402 | S | 5/2017 | Shirley et al. | |
| D804,904 | S | 12/2017 | Noveletsky et al. | |
| D813,603 | S | 3/2018 | Tu | |
| D830,126 | S | 10/2018 | Rohe | |
| D872,511 | S | 1/2020 | Parks | |
| 10,792,630 | B1 | 10/2020 | Pamplin | |
| D925,973 | S | 7/2021 | Yessin et al. | |
| 11,224,301 | B2 | 1/2022 | Delgado Carmona | |
| D1,126,644 | S | 5/2026 | Lee | |
| 2005/0174882 | A1* | 8/2005 | Krasne .................. | A47J 43/042 366/249 |

FOREIGN PATENT DOCUMENTS

| | | | |
|---|---|---|---|
| CN | 213097443 | U | 5/2021 |
| CN | 306764700 | | 8/2021 |
| DE | 202019106625 | U1 | 12/2019 |
| GB | 6150366 | | 7/2021 |
| GB | 6150367 | | 7/2021 |
| ID | A00202002136-0001 | | 9/2020 |
| IN | 329493-001 | | 5/2022 |
| KR | 20110114015 | A | 10/2011 |
| KR | 20200001536 | U | 7/2020 |

OTHER PUBLICATIONS

Amazon.com, Inc., “Café Dynamo Small Rechargeable Handheld Coffee Maker—Portable, Wireless, Fully Automatic for Household or On-the-Go Brewing with Capsules or Coffee Powder”, [online]. (Date First Available: Nov. 13, 2023). [Retrieved from the Internet on Oct. 9, 2024 at https://www.amazon.com/Café-Dynamoo-Handheld-Coffee-Maker/dp/B0CN7D83QB]; 5 pages.

Amazon.com, Inc., “FORZA 700ml Protein Shaker Bottle | BPA-Free with Non-Leak Cap for Protein Shakes & Sports Drinks | Multiple Colours Available”, [online]. (Date First Available: Apr. 4, 2022). [Retrieved from the Internet on Oct. 9, 2024 at https://www.amazon.co.uk/FORZA-BPA-Free-Non-Leak-Multiple-Available/dp/B09X5YX7WM]; 9 pages.

Amazon.com, Inc., “GEMFUL Shaker Bottle for Protein Mixes BPA-Free Leak Proof Smoothies Mixer Water Cups 2 Pack 750ml”, [online]. (Date First Available: Sep. 3, 2021). [Retrieved from the Internet on Oct. 9, 2024 at https://www.amazon.co.uk/Shaker-Bottle-Protein-BPA-Free-Smothies/dp/B09BCMGMGB]; 14 pages.

Amazon.com, Inc. “Haden Portable Blender—Electric Portable Smoothie & Shake Blender with Protective Sleeve 80W, 3c00ml Personal Blender—Sage Green”, [online]. (Date First Available: Aug. 12, 2020). [Retrieved from the Internet on Jan. 15, 2026 at https://www.amazon.co.uk/Haden-Portable-Blender-Electric-Protective/dp/B08FRL7F4V]; 6 pages.

Amazon.com, Inc. “RoadPro RP0719 Heated Travel Mug, 12 Volt 425ml, Silver, Black”, [online]. (Date First Available: May 19, 2021). [Retrieved from the Internet on Oct. 9, 2024, at https://www.amazon.it/RoadPro-RP0719-termica-viaggio-Argento/dp/B00LYD9GZ2]; 7 pages.

EP Application No. 23171346, Extended European Search Report mailed Oct. 13, 2023; Applicant Dart Industries Inc.; 7 pages.

U.S. Appl. No. 29/838,673, filed May 13, 2022; Inventor Lee, Hsiao Fong.

* cited by examiner

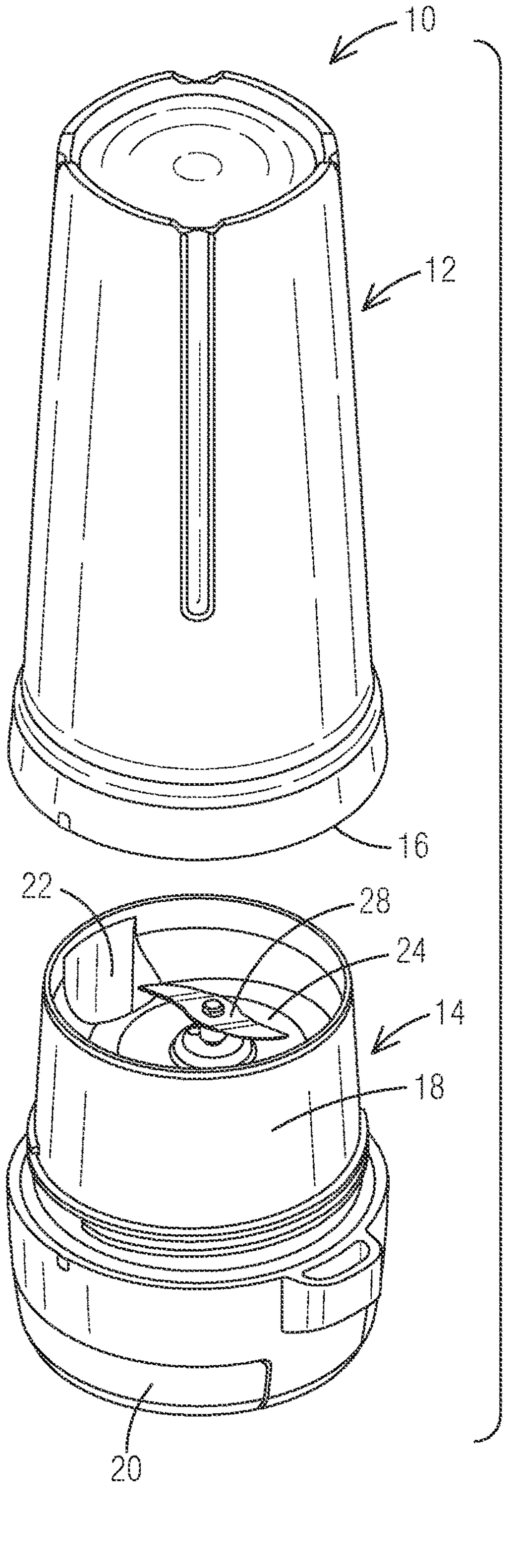
FIG. 3
FIG. 4
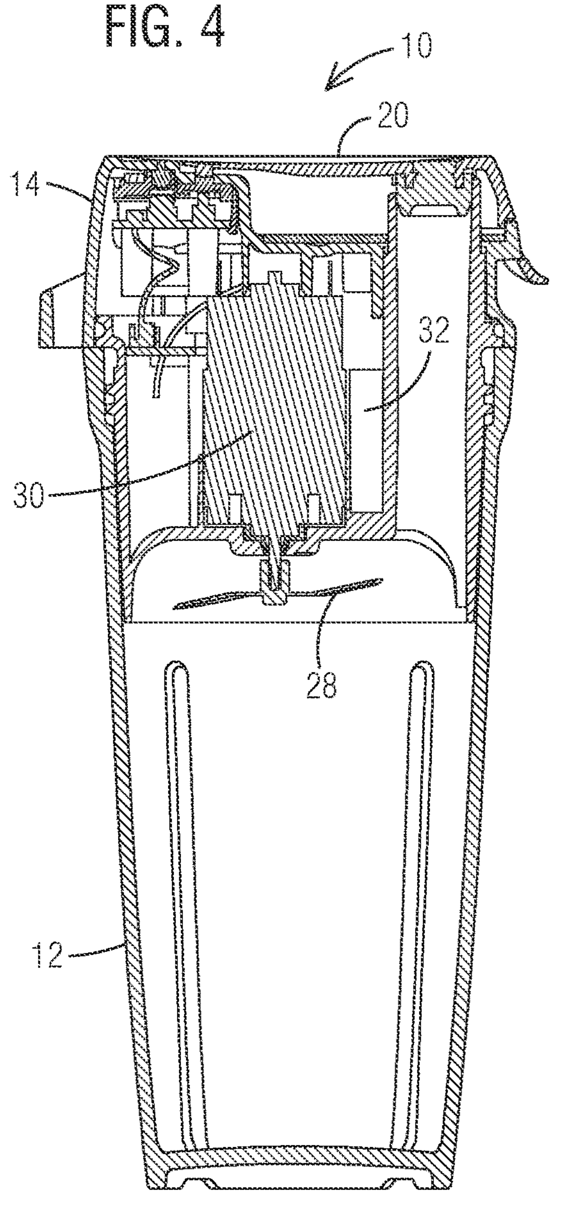

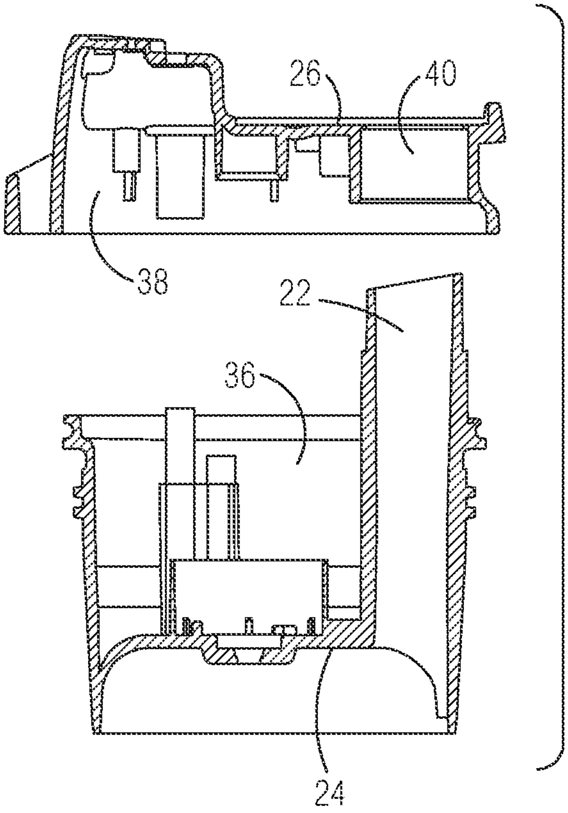
FIG. 7
FIG. 8
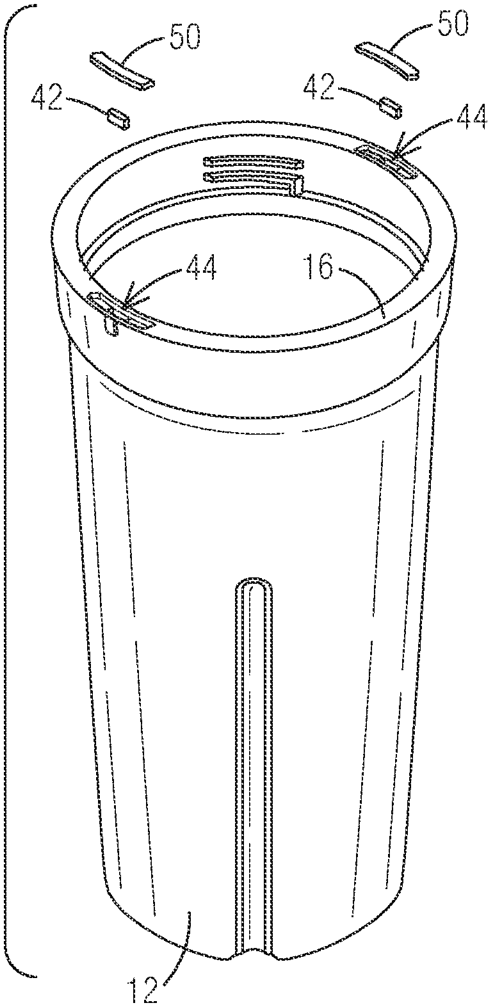
FIG. 9
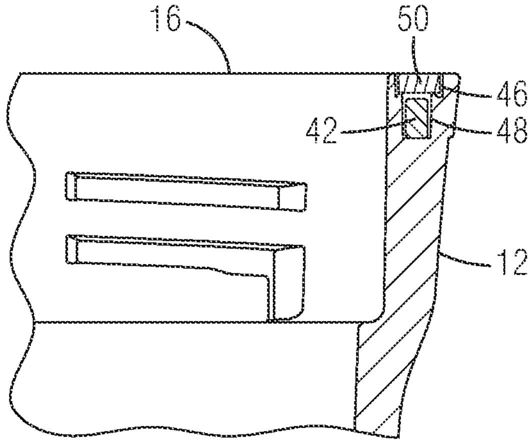

PORTABLE DRINK BLENDER

CROSS REFERENCE TO RELATED APPLICATIONS

This application is related to U.S. Design patent application Ser. No. 29/838,673, filed May 13, 2022, now issued as U.S. Pat. Design No. D1126644, issued May 19, 2026, which is incorporated by reference herein.

STATEMENT REGARDING FEDERALLY SPONSORED RESEARCH

Not applicable.

BACKGROUND OF THE INVENTION

The present invention relates in general to blenders for food, and in particular personal food blenders of the type capable of being portable.

It is known to provide a personal blender, typically intended for blending fruit based drinks commonly known as "smoothies". These were first developed as smaller versions of standard upright blenders. It was then improved with the pitcher converted to a closed top, which allowed the entire base and "pitcher" to be inverted after blending such that the "pitcher" could be used as a drinking tumbler. This was further improved to provide the base with a through-spout. This allowed the user to retain the base motor on top of the tumbler to act as a cap. In this manner the contents of the tumbler could be held in their unblended original state for some time and only later blended just before intended consumption. For example, the smoothie ingredients could be prepared at home in the morning, the blender brought to work, and then blended just prior to lunch.

SUMMARY OF THE INVENTION

An object of the present invention is to provide a portable drink blender having improved safety and reliability.

Another object of the present invention is to provide a portable drink blender which includes a unitary leak-proof spout extending through the motor housing.

A further object of the present invention is to provide a portable drink blender with offset blade rotation axis to improve safety and allow the use of a straw.

Yet another object of the present invention is to provide a portable drink blender with a cap hinged to the motor housing to seal the spout, and in which the blender activation switch may only be operated with the cap closed.

These and other objects are achieved by a portable drink blender as described below.

BRIEF DESCRIPTION OF THE DRAWINGS

The objects and features of the invention noted above are explained in more detail with reference to the drawings, in which like reference numerals denote like elements, and in which:

FIG. 3 is an exploded bottom perspective view thereof with cover closed;

FIG. 4 is a side cross-sectional view along line 12-12 of FIG. 10 cutting a lateral plane from the top of blender 10 with cover 20 in the closed position to the bottom of tumbler 12 of FIG. 1;

FIG. 7 is a side cross-sectional view along line 12-12 of FIG. 10 cutting a lateral plane from the top of the upper housing 38 to the bottom of lower housing 36 of FIG. 6;

FIG. 8 is a detailed exploded perspective view of the tumbler;

FIG. 9 is a detailed cross-sectional view along line 12-12 of FIG. 10 cutting a lateral plane from the top of blender 10 with cover 20 in the open position to the bottom of tumbler 12 of FIG. 2;

DETAILED DESCRIPTION OF THE INVENTION

Figure 1:
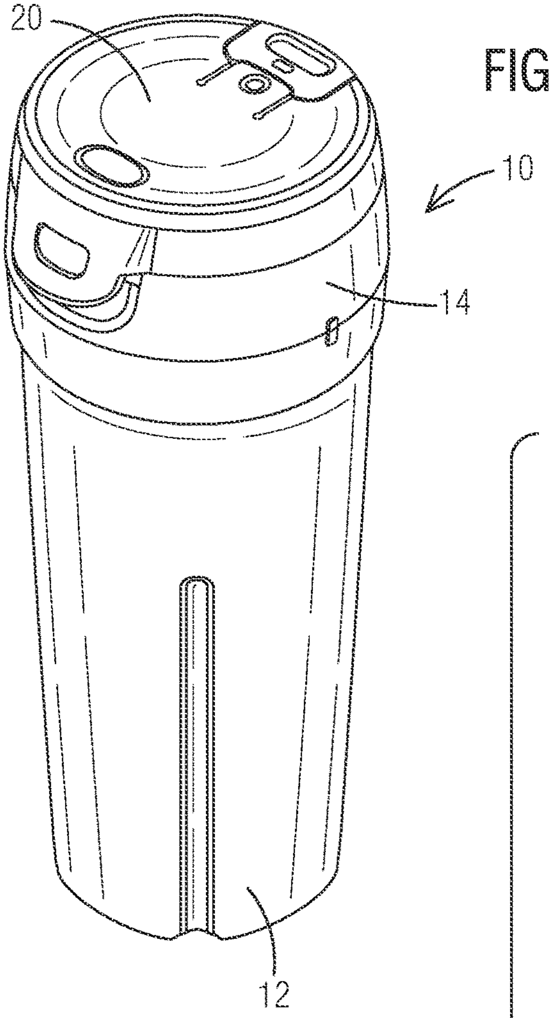
FIG. 1 is a top front perspective view of the portable drink blender according to the present invention with cover closed.
Figure 2:
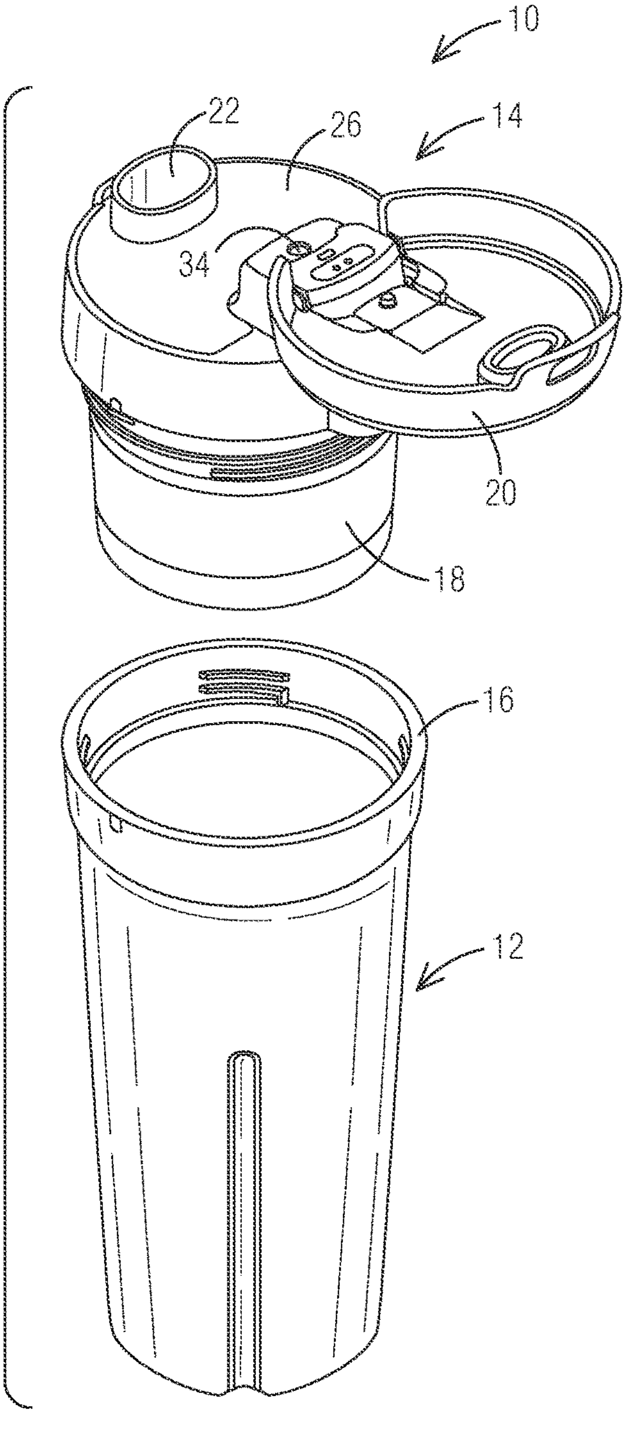
FIG. 2 is an exploded top rear perspective view thereof with cover open.

With reference to FIG. 1, a portable drink blender according to the present invention is generally designated by reference numeral 10. The blender 10 generally includes tumbler 12 and a cap 14. The tumbler 12 is formed as a concave element formed of a base, and at least one side wall extending from the base upward to a rim 16. Within the tumbler 12 is formed a cavity which receives the solids and liquids intended to be blended, and which holds these materials after they are blended.

The cap 14 is comprised of a motor housing 18 and a cover 20 pivotally mounted to the cap 14 for movement between a closed position and an open position. Cap 14 includes a spout 22 extending through the body of the cap 14 and extending from the cap 14 to allow a user to engage the spout 22 with their mouth for drinking the contents of the tumbler 12. The cover preferably will close the spout 22 when cover 20 is in the closed position in a manner to prevent liquid from exiting the spout.

The cap 14 is sized to closely fit within the rim 16 of tumbler 12, in a manner to prevent liquid from leaking. It is preferred that both the cap 14 and rim 16 have a circular shape, and may be detachably secured together as by a threaded connection. The cap 14 includes a lower face 24 received within the cavity of tumbler 12, and an upper face 26 outside the tumbler and accessible to the user. The cap 14 and tumbler 12 define a vertical central longitudinal axis.

Figure 5:
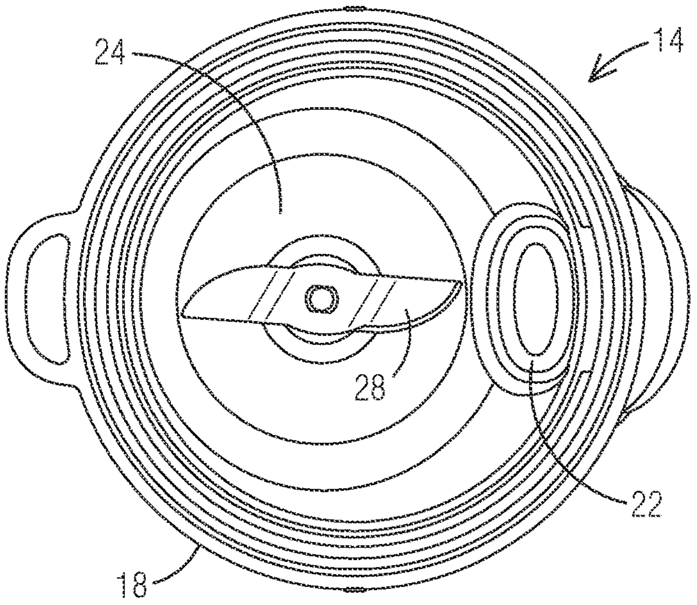
FIG. 5 is a bottom view of the cap with cover closed.
Figure 6:
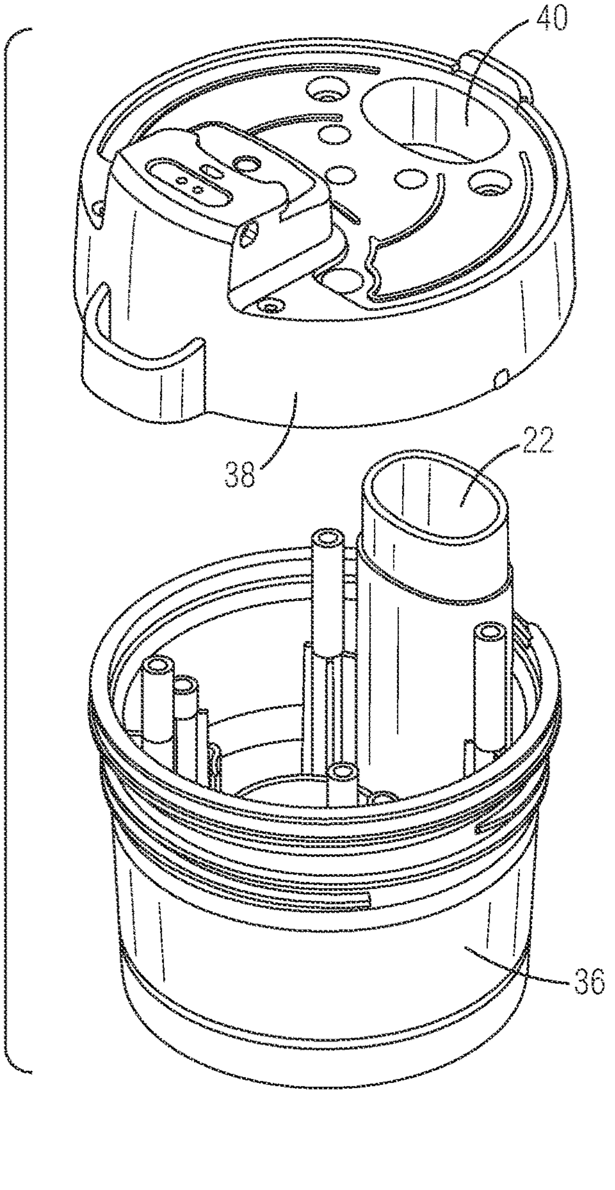
FIG. 6 is a detailed exploded perspective view of the upper and lower motor housings.

As shown, the cap 14 includes a set of blender blades 28 mounted on a rotation shaft extending from the lower face 24 of the cap 14 in parallel to the longitudinal axis. As best shown in FIG. 5, the rotation shaft of the blades 28 is not coincident with the longitudinal axis of blender 10. Rather, the rotation shaft of blades 28 is offset laterally in a direction away from the spout 22. This will reduce the length of the blades 28 which extend across the opening of spout 22. In the embodiment shown, the offset of the shaft of blades 28 is in a direction directly opposite the spout 22; and the distance of the offset of the shaft of blades 28 and the length of blades 28 is chosen such that the blades 28 stop short of the spout 22. In other words, the blades 28 do not cross the opening of spout 22 whatsoever. This improves the safety of the blender 10 by reducing the possibility of a finger being injured when inserted into spout 22. Additionally, this improves the functionality of blender 10. With this arrangement, the spout 22 may alternatively be used to receive a drinking straw (not shown), and this placement of blades 28 will prevent damage to the straw.

As may be envisioned, the blades 28 must be powered to provide the blending action necessary. To this end, the motor housing 18 will include an electric motor 30 operatively connected to the shaft of blades 28, batteries 32 to power the motor 30, and a power switch 34 to activate the motor 30 to begin blending. These electrical components must be protected from the liquid being blended, and similarly the liquid being blended must be protected from contamination by the electrical components. These components are therefore sealed within the motor housing 18 in a liquid-tight manner.

The need to manufacture the motor housing 18 with the various electrical components inside leads to the motor housing 18 being formed of at least two pieces. In the embodiment shown this is a lower housing 36 and an upper housing 38. The lower and upper housings 36 and 38 fit together in a mating relationship to create a closed internal cavity which will enclose the motor 30 at a minimum. The embodiment shown employs rechargeable batteries for batteries 32 and as such this embodiment also encloses batteries 32 within this internal cavity. The mating line between the upper and lower housings 36 and 38 preferably includes a gasket, as is known in the art.

A further feature of the present invention is the formation of the spout 22 within the housings 36 and 38. In particular, the spout 22 is fully formed as a complete unit within the lower housing 36. The upper housing 38 forms no portion of the spout 22. Rather, the upper housing 38 includes a spout aperture 40 and the spout 22 extends through the aperture 40 with the upper housing 38 sealing against the exterior of spout 22 as part of the mating relationship between the housings 36 and 38. This is a significant improvement over prior art designs which split the spout between the two housings. The present unitary design of the spout 22 eliminates any possibility of leakage from the spout into the motor housing 18, and more importantly any contamination into the spout 22 from the motor housing 18.

The blender 10 is capable of disassembly, with the blades 28 being accessible to the user when the cap 14 is removed from the tumbler 12. The cap 14 further includes the motor 30 and batteries 32 allowing operation of the blades 28. This obviously presents a safety hazard, and it is known to provide an interlock to prevent operation of the motor 30 when the cap 14 is removed from tumbler 12. The blender 10 may include various improvements in the interlock mechanism and add additional interlock mechanisms not previously known.

First discussed will be the interlock to prevent motor operation while the cap 14 is removed from tumbler 12, with reference to FIGS. 8 and 9. While various interlock mechanism could be employed, it is preferred to provide one or more magnets 42 which will interact with Hall effect switches (not shown) associated with the cap 14. The use of magnets in these situations is known, but has suffered from problems such as the magnets becoming dislodged or corroded. Either of these problems can result in the interlock not operating properly. To overcome this problem, the present invention forms a two-step interlock cavity 44 in the rim 16 of tumbler 12, with one cavity 44 formed for each magnet 42. The cavity 44 includes a block cavity 46 opening directly onto the rim 16. The block cavity 46 preferably has an elongated form. The cavity 44 further includes a second magnet cavity 48 formed within, and opening directly onto, the block cavity 46. The magnet 42 is sized to be closely received within the magnet cavity 48. The blender 10 is also provided with a sealing block 50 for each interlock cavity 44. The sealing block 50 is sized to be closely received within the block cavity 46. With the magnet 42 received within magnet cavity 48, and the block 50 received within the block cavity 46, the block 50 is then subjected to ultrasonic welding to secure the block 50 to the tumbler 12. In this way the magnet 42 is secured to the tumbler 12 in a manner preventing loss and oxidation.

In operation, the user will fill the tumbler 12 with the desired ingredients and secure the cap 14 to the tumbler. The motor 30 will be engaged by manual pressing of the power switch 34, and the blender 10 will be inverted to rest upon the cover 20 with the tumbler 12 uppermost. In this operation it is assumed that the cover 20 will be fully closed to prevent leakage of the tumbler contents from the inverted spout 22 during blending. The present invention provides a further interlock mechanism to eliminate this assumption. In particular, the blender 10 may include a cover interlock to ensure that the motor 30 may not be engaged unless the cover 20 is fully closed.

Figure 11:
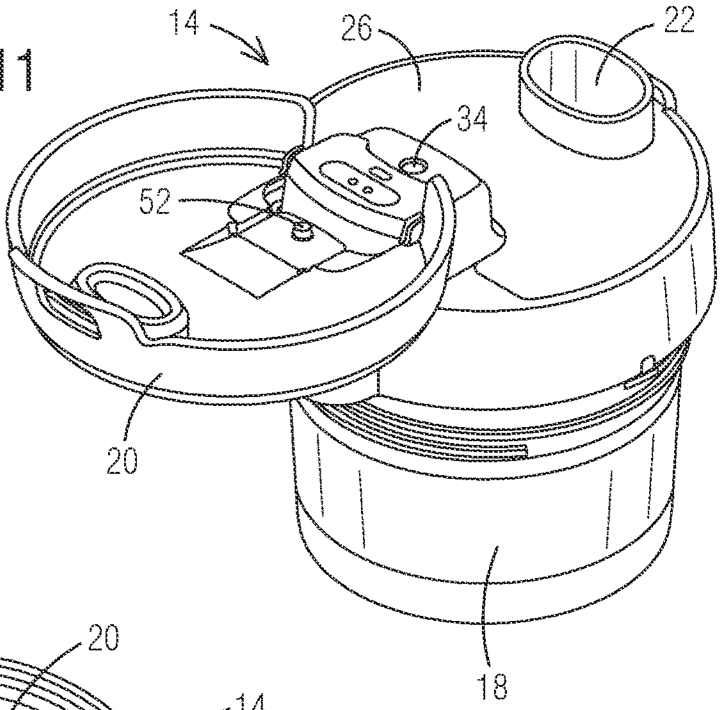
FIG. 11 is a top rear perspective view of the cap with cover open.
Figure 10:
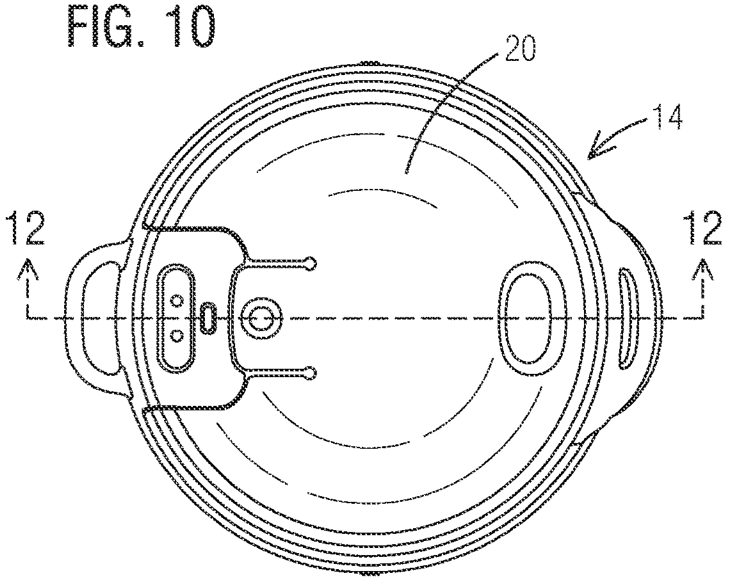
FIG. 10 is a top view of the cap with cover closed.
Figure 12:
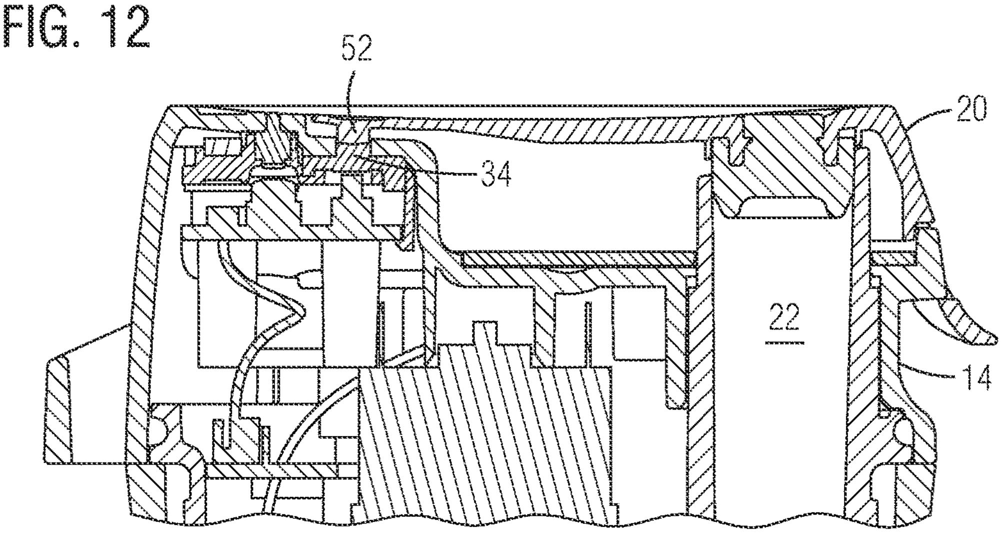
FIG. 12 is a detailed cross-sectional view along line 12-12 of FIG. 10.

With reference to FIGS. 10-12, it is first seen in FIG. 11 that the power switch 34 is formed on the upper face 26 of cap 14. In particular, the power switch 34 is recessed within the upper face 26 to prevent direct manual operation of the power switch 34 by the user: the recess is too small for the user's finger to depress the power switch 34. Next, from FIG. 10 it is seen that the cover 20 is formed such that a portion of the cover 20 will overlie the power switch 34 when cover 20 is in the closed position (the position in which the spout 22 is sealed closed). The portion of the cover 20 overlying the power switch 34 is formed with an actuating pin 52 which will extend into the recessed power switch 34 when cover 20 is in the closed position. Further, the area of cover 20 surrounding the actuating pin 52 is formed to be flexible. In the embodiment shown, a pair of slots extend inward from an edge of the cover 20 to form a flexible tab from which the actuating pin 52 extends. As may be envisioned, manual pressure on the cover 20 in the area over actuating pin 52 will cause the actuating pin 52 to activate the power switch 34 to begin operation of the motor 30. In this manner, operation of the motor 30 is prevented unless the cover 20 is in the closed position.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A portable drink blender, comprising:

a tumbler having at least one side wall extending upwardly to an upper rim and defining a beverage cavity therein;

a cap detachably secured to said upper rim of said tumbler, said cap defining a motor housing and having upper and lower faces, a spout extending through and extending from said upper face of said cap, and blender blades mounted for rotation by a rotation shaft extending from said lower face of said cap, and a cover pivotally mounted to said cap and movable from an open position allowing user access to a free end of said spout and a closed position sealing said spout, wherein said rotation shaft for said blender blades is offset laterally away from said spout.

2. A portable drink blender as in claim 1, wherein said blender blades do not extend beyond an inner edge of said spout.

3. A portable drink blender as in claim 1, wherein said cap further includes a power switch operatively connected to said motor, said power switch being recessed in said upper face of said cap, and wherein said cover includes an actuating pin which extends into said recessed power switch only when said cover is in said closed position.

* * * * *